Figure 1:
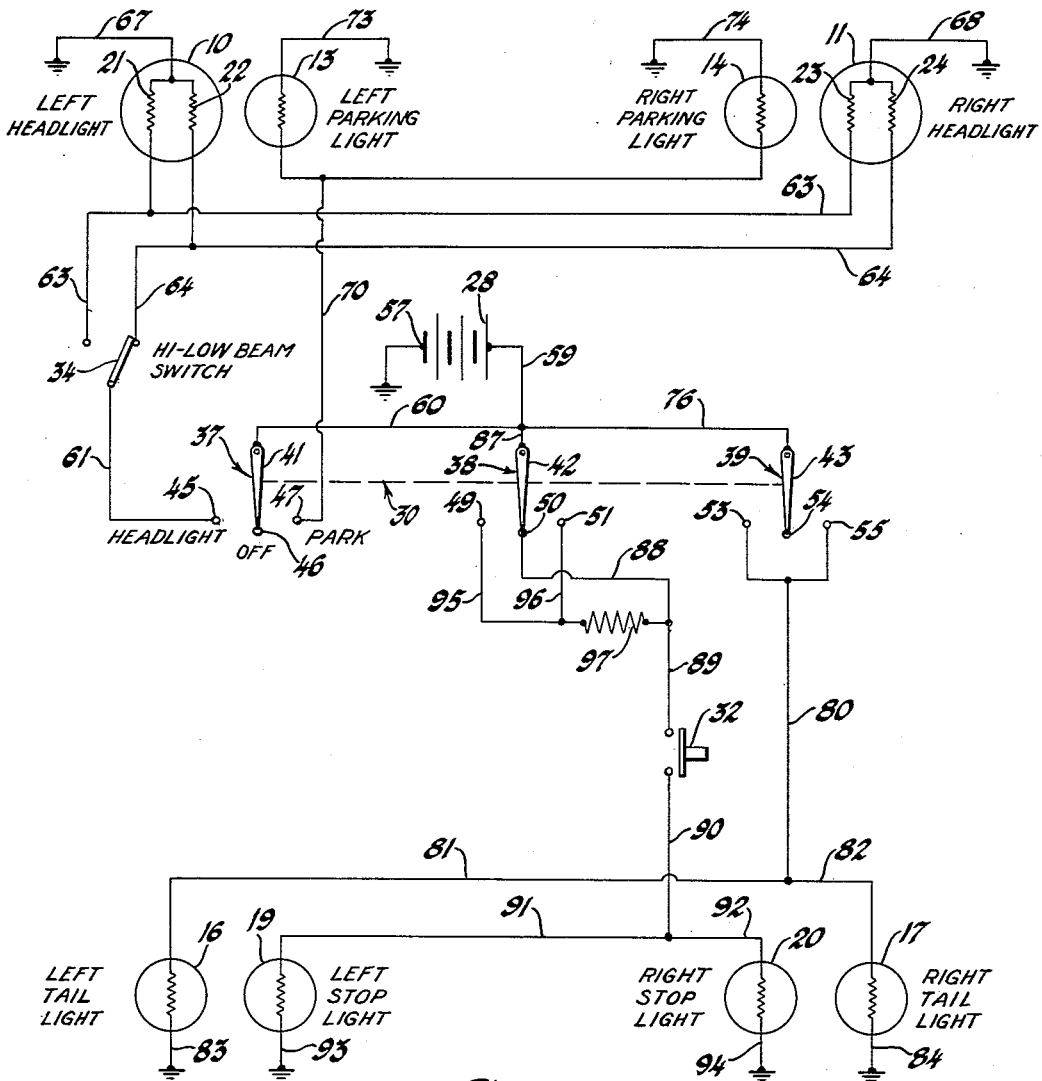

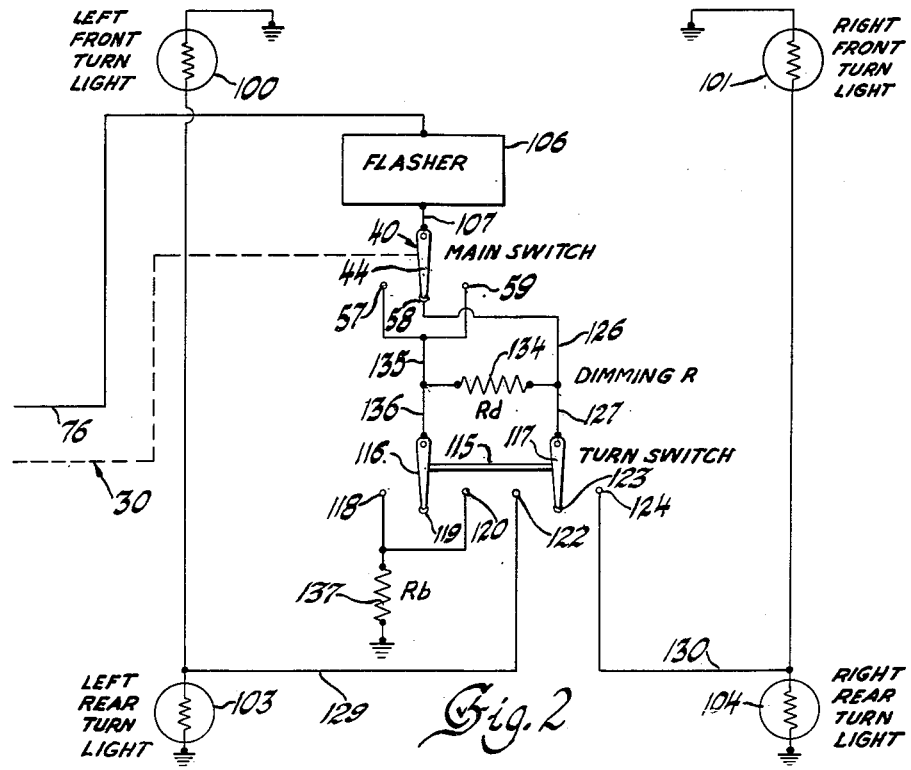
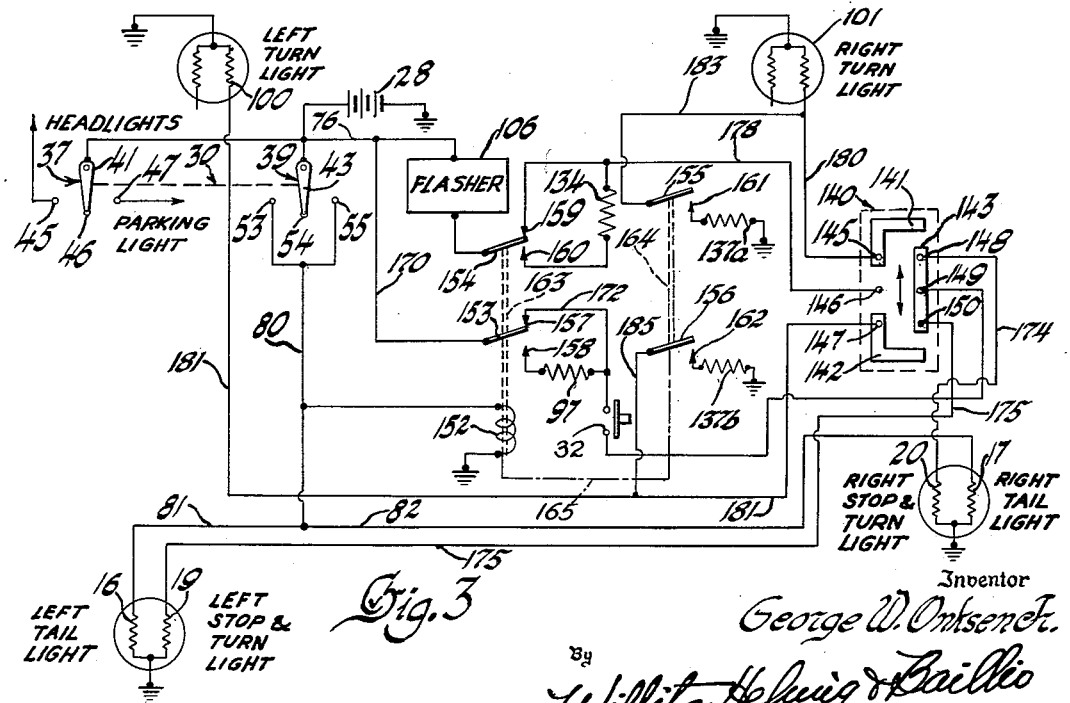

United States Patent Office 2,731,584
Patented Jan. 17, 1956

2,731,584

VEHICLE ILLUMINATION SYSTEM

George W. Onksen, Jr., Anderson, Ind., assignor to General Motors Corporation, Detroit, Mich., a corporation of Delaware Application June 4, 1952, Serial No. 291,639

6 Claims. (Cl. 315—81)

This invention relates to illumination systems for motor vehicles.

Motor vehicles for highway use are commonly provided with headlights, tail lights and parking lights, which may be referred to collectively as operating lights. In addition, they ordinarily are equipped with a brake or stop signal light and turn indicator lights, which may be collectively referred to as warning or signal lights. In some arrangements, the warning lights or some of them may utilize the same filaments as some of the operating lights.

In any event, in known vehicle illumination systems, the warning lights have been unsatisfactory because if they are of sufficient brilliance to command attention during daylight driving conditions, they are too bright and cause objectionable glare under twilight or night driving conditions.

The principal object of this invention is to provide a solution for this problem by modifying the brilliance of the warning lights so that they may be of full brilliance during daytime conditions and of reduced brilliance at night. A further object of the invention is to provide this result in such wise that the result is obtained substantially automatically and with a minimum of attention from the operator of the vehicle. A further object is to provide for reducing the brilliance of the warning lights by a system which is simple and which is well adapted to incorporation in warning signal systems of the most desirable characteristics.

In the preferred embodiments of the invention, the brilliance of the warning lights is reduced whenever the operating lights, or any of them, are energized, so that whenever light conditions are such as to require the use of the operating lights, the warning lights are dimmed. This may be accomplished in various manners, but is preferably accomplished by reducing the voltage applied to the warning lights by the insertion of a dimming resistor or resistors in the energizing circuits of the lights.

The preferred manner in which the objects of the invention are realized, together with the attending features and advantages thereof, will appear more fully from the following detailed description and drawings wherein: Fig. 1 is a schematic representation of a vehicle illumination system having a brake operated stop light circuit which includes means for controlling the brilliance of the stop lights in accordance with a preferred embodiment of the invention; Fig. 2 is a schematic diagram of a turn signal indicator circuit that may be used with the vehicle illumination system of Fig. 1 and which includes means for controlling the brilliance of the turn signal lights in accordance with the invention; and Fig. 3 is a schematic diagram of a different stop signal and turn indicator system in accordance with the invention.

Referring to the drawings, Fig. 1 illustrates the basic complement of vehicle lights currently employed on substantially all passenger and commerical motor vehicles as required by statute comprising headlights 10, 11 and parking lights 13, 14, located at the forward end of the vehicle, and tail lights 16, 17 and stop lights 19, 20 located at the rear of the vehicle. The positions of the lights relative to the respective ends and sides of the vehicle are substantially as shown. The headlights 10, 11 employ conventional dual filament lamp bulbs having selectively energizable high-beam filaments 21 and 23 and low-beam filaments 22 and 24, respectively.

In addition to the aforementioned vehicle lights, the illumination system further comprises a suitable D. C. power source such as the vehicle storage battery 28, main switching means 30 under the control of the operator for selectively energizing the head or parking lights with the tail lights, a stop light switch 32, which may be of a conventional brake operated variety, and a manually operable switch 34, which may be the standard beam changing switch mounted on the floor board for use by the operator. The control switch 30, which is usually mounted on the vehicle instrument panel, may comprise a plurality of ganged or concurrently actuable multiple-position switches 37, 38, and 39, each having a movable pole or switch arm 41, 42, and 43 respectively associated with a plurality of energizable contacts 45, 46, 47; 49, 50, 51; and 53, 54, 55 for energization of the head and parking light, stop light, and tail light circuits, respectively, as illustrated.

The headlight circuit may be traced from the grounded terminal 57 through the storage battery 28, conductors 59, 60, pole 41 and contact 45 of switch 37, conductor 61, beam switch 34, conductors 63 or 64 depending upon the position of switch 34, and the high or low-beam filaments of headlights 10, 11 connected in parallel to ground through conductors 67 and 68. The parking light circuit may be traced from the battery 28 through conductors 59, 60, pole 41 and contact 47 of switch 37, conductor 70, and the parking lights 13 and 14 connected in parallel to ground through conductors 73 and 74. The tail lights are simultaneously energized with the actuation of the head lights or parking lights through a circuit that may be traced from the battery 28 through conductors 59, 76, pole 43 and either of contacts 53, 55, of switch 39 depending upon whether the head or parking lights are energized, conductors 80, 81, and 82, and tail lights 16 and 17 connected in parallel, to ground through conductors 83 and 84, respectively.

When switch arms 41 and 43 are on contacts 46 and 54, respectively, the operating lights are de-energized.

When neither the head lights or parking lights are energized, the stop light circuit may be traced from the battery 28 through conductors 59 and 87, pole 42 and contact 50 of switch 38, conductors 88 and 89, stop light switch 32, conductors 90, 91, and 92, through the stop lights 19 and 20 connected in parallel, to ground through conductors 93 and 94. When either the head lights or parking lights are energized, the stop light circuit may be traced from switch 38, conductors 95 or 96, voltage dropping resistor 97, conductor 89, stop light switch 32, and then through the stop lights to ground.

In accordance with the invention, the dimming of the stop lights is accomplished simultaneously with the energization of the head lights or parking lights by inclusion or exclusion of the resistor 97 in the stop light circuit. The voltage drop appearing across the series connected resistor 97 functions to reduce the voltage applied to the stop lights and decreases their brilliancy. The dimming resistor is not included in the stop light circuit when the head lights or parking lights are de-energized and full rated voltage is applied to the stop lights so as to afford maximum brilliancy. The size of the resistor is made such, depending upon the size of the stop light bulb, as will produce an apparent reduction in brilliance to obtain the effective dimming desired. It will be noted that the stop lights are operable at all times and that no further manual operation other than that required of the operator to energize and de-energize the head lights and parking lights is necessary to vary the brilliance of the stop lights.

Fig. 2 is a schematic circuit diagram of a turn signal indicator system that may be added to the vehicle illumination system of Fig. 1 to provide for dimming the turn indicator lights so as to prevent glare therefrom when the operating lights of the vehicle are energized. The left and right turn signals 100 and 101 located at the forward end of the vehicle could each be one filament of a dual filament lamp bulb, the other filament of which is used for the parking light. The left and right turn signals 103 and 104 at the rear of the vehicle can be separate lamp bulbs independent of the stop signals and tail lights, and are each connected in parallel with the corresponding left or right forward turn indicator 100 and 101, respectively. In addition to the turn signals 100, 103 and 101, 104, the direction indicator system includes a conventional flasher switch 106, a multiple position switch 40, which forms another section of the ganged switching means 30 (Fig. 1) and comprises a switch arm 44 and stationary contacts 57, 58 and 59, and a separately operable turn indicator switch 115 comprising a pair of ganged switch arms 116 and 117, each of which is associated with a separate set of stationary contacts 118, 119 and 120, and 122, 123 and 124.

Under daylight operating conditions with the turn indicator switch 115 placed in condition to signal either a left or right turn, the turn indicator lights at the forward and rear of the vehicle are energized through a circuit from the vehicle battery 28, line 76, flasher 106, line 107, switch arm 44 and the mid-contact 58 of switch 40, lines 126 and 127, switch arm 117 and either of contacts 122 or 124 of the turn switch, lines 129 or 130 to the left or right turn indicator lights 100, 103 or 101, 104 depending upon the setting of the turn indicator switch 115. When the main switching means 30 is actuated to energize the head lights or parking lights, switch arm 44 of switch 40 is concurrently caused to engage contact 57 or 59 thereof, and a dimming resistor 134, similar to resistor 97 in the stop light circuit, is placed in series with the turn indicator lights through lines 135 and 127 and switch arm 117 of the turn switch so as to decrease the voltage applied thereto and accomplish the desired dimming action.

In order to obtain satisfactory operation of the flasher 106, it is desirable to maintain the current therethrough substantially constant at all times. Therefore, to compensate for the reduction of load on the flasher when the dimming resistor 134 is inserted in series with the turn indicator lights, a bleed-off resistor 137 is placed in shunt with the series combination of the dimming resistor 134 and the turn indicator lights through lines 135 and 136 and switch arm 116 of the turn switch 115 so as to increase the load on the flasher. When the operating lights are de-energized, switch arm 44 of switch 40 is in engagement with contact 58 thereof and resistor 134 is connected in series with resistor 137 through arm 116 of the turn switch 115 and the series combination of resistors 134 and 137 is shunted across the turn indicator light circuit. Thus, with the resistance of the bleed-off resistor 137 equal to the total effective resistance of the turn indicator lights, the current through the flasher is maintained at substantially the same value with the turn signals operating in bright or dim condition.

Fig. 3 is a schematic circuit diagram of a stop signal and turn indicator system in accordance with the invention and wherein the rear stop signals 19, 20 are flashed as turn signals. The tail and stop lights may be separate filaments of a dual filament lamp bulb. The turn indicator system includes a flasher 106 and a turn indicator switch 140, the latter comprising an arrangement of spaced conducting segments 141, 142, and 143, which are mounted so as to be movable up or down as a unit, and a number of stationary contacts 145, 146, 147 and 148, 149, 150 which are adapted to make electrical contact with the movable segments of the switch, substantially as shown. Resistances 97 and 134 are inserted in the stop and turn indicator circuits for dimming the warning lights when either the headlights or parking lights are energized by the operator by the action of a relay 152 which comprises a first pair of armatures 153 and 154 each of which is associated with a separate set of stationary contacts 157, 158 and 159, 160, respectively, and a second pair of armatures 155 and 156 each of which has a separate individual contact 161 and 162, respectively. Although the armatures 153, 154 and 155, 156 are shown mounted on separate actuator rods 163 and 164, respectively, which are associated with and actuated by the same relay coil 152 as indicated by the dashed line 165, they could be mounted on a common actuator rod instead. In place of the relay 152, the armatures 153, 154, 155 and 156 thereof could be separate manually operable switch arms which are concurrently actuated with the main switching means 30, if desired.

With the relay 152 de-energized, as during day operating conditions, the stop light circuit may be traced from the battery 28 through lines 76 and 170, armature 153 and contact 157 of relay 152, line 172, the brake-operated stop switch 32, contact 149, conducting segment 143 and both contacts 148 and 150 of the turn indicator switch 140 shown in its neutral position, and then through conductors 175 and 174 leading individually to the stop lights 19 and 20, respectively, and to ground. With the turn indicator switch 140 moved in a downward direction to signal a right turn, for example, the turn indicator circuit may be traced from the vehicle battery 28 through line 76, flasher 106, armature 154 and contact 159 of relay 152, line 178, contact 146 and conducting segment 141 to contacts 145 and 148 of the turn indicator switch 140. Contact 145 is connected to the forward right turn indicator 101 through line 180 and contact 148 to the rear right turn indicator 20 through line 174. Under these conditions, actuation of the brake switch 32 energizes the opposite or left stop light 19 as previously described, the right stop light 20 and forward right turn indicator light 101 flashing on and off to signal approaching and following vehicles of an impending right turn.

When either the headlights and tail lights or parking lights and tail lights are energized by the operator, as for night operating conditions, the relay 152 is energized from the vehicle battery through switch arm 43 and contact 53 or 55 of the tail light switch 39, which is controlled by the main switching means 30, and the contacts 158 and 160 are engaged by the relay armatures 153 and 154, respectively, so as to insert the dimming resistors 97 and 134 in the stop signal and turn indicator circuits. Thus, with the turn indicator switch 140 moved in an upward direction to signal a left turn, for example, the turn indicator circuit may be traced from the vehicle battery 28, through flasher 106, armature 154 and contact 160 of relay 152, dimming resistor 134 and line 178 to contact 146, conducting segment 142 and contacts 147 and 150 of the turn indicator switch 140 and then to the forward left turn indicator 100 through conductor 181 and the rear left stop light 19 through conductor 175.

Under these conditions, actuation of the brake switch 32 energizes the opposite or right stop light 20 from the battery through line 170, armature 153 and contact 158 of relay 152, stop light dimming resistor 97, brake switch 32, contact 149, conducting segment 143 and contact 148 of turn switch 140 and to the right stop light 20 through line 174. It will be noted that dimming resistors are included in both the stop signal and turn indicator circuits and that the left stop light 19 and the forward left turn indicator 100 flash on and off to signal the left turn.

The load on the flasher mechanism 106 of the circuit of Fig. 3 is maintained substantially equal with the turn signal lights operating in either dim or bright condition by the action of a pair of similar bleed-off resistors 137a and 137b which are connected in the turn indicator system by the relay armatures 155 and 156 when the relay is energized through the switch section 39 of the manually operated switching means 30. Bleed-off resistor 137a is included in a circuit which is connected in parallel with the right turn light 101 and may be traced from conductor 183 connected to conductor 180, armature 155 and contact 161 to one side of resistor 137a, the other side of which is grounded. Resistor 137b is included in a circuit which is connected in parallel wtih the left turn light and may be traced similarly from conductor 185 connected to conductor 181, relay armature 156 and contact 162 to one side of resistor 137b, the other side of which is grounded.

When relay coil 152 is not energized, the circuits of the bleed-off resistors are open and the current through the flasher 106 is that required to illuminate the right or left turn lights when the turn switch 140 is actuated. When relay coil 152 is energized, the armatures 155 and 156 are closed and a circuit is completed through either of resistors 137a or 137b depending upon whether the turn switch is conditioned for a right or left turn. The size of the bleed-off resistors is made such that with the dimming resistor 134 connected in series with the right or left turn lights to effect a desired reduction in brilliance thereof, the bleed-off resistor 137a or 137b, depending upon whether the right or left turn lights are energized, will increase the current through the flasher by an amount corresponding to the reduction in current through the turn lights caused by the dimming resistor 134.

The circuit of Fig. 3 has the advantage over that of Fig. 2 in that current through the bleed-off circuits of Fig. 3 is established only during night operating conditions and when the turn switch 140 is actuated. Since the turn signals are energized only during brief intervals, the flow of current through the bleed-off resistor 137 of Fig. 2 during daytime operating conditions is not a serious objection but could be avoided simply by provision of a switch concurrently actuated with the main switching means 30 and connected in line 136 to complete the circuit therethrough only when the operating lights are energized.

There is thus provided a simple, efficient, inexpensive, and fool-proof warning system in which the objectionable night-time glare from the stop signal and turn indicator lights of a vehicle is eliminated and which yet affords sufficient brilliancy therefrom during day operating conditions.

It is to be understood that the above described arrangement is illustrative of the application of the principle of the invention and that other arrangements and modifications may be devised by those skilled in the art without departing from the spirit and scope thereof.

I claim:

1. A vehicle illumination system including a source of electrical power, an operating lamp circuit having a plurality of operating lamps and switch means connecting said operating lamps to said electrical source, a warning signal circuit having a warning lamp and switch means connecting said warning lamp to said electrical source, a dimming circuit including means for reducing the intensity of said warning lamp and auxiliary switch means inserting said intensity reducing means in circuit with said warning lamp, and a manually controlled gang means interconnecting said switch means of said operating lamp circuit and said auxiliary switch means and permitting switching of said intensity reducing means in and out of said warning signal circuit simultaneously with the operation of said switch means of said operating lamp circuit.

2. A vehicle illumination system including a source of electrical power, an operating lamp circuit having a plurality of operating lamps and switch means connecting said operating lamps to said electrical source, a turn signal circuit having a pair of turn indicator lamps connected in separately energizable circuits and switch means connecting either of said turn indicator lamps to said electrical source, a dimming circuit including means for dimming the intensity of said turn indicator lamps and auxiliary switch means inserting said dimming means in circuit with either of said turn indicator lamps, and manually controlled gang means interconnecting said switch means of said operating lamp circuit and said auxiliary switch means and permitting switching of said intensity dimming means in and out of said turn signal circuit simultaneously with the operation of said switch means of said operating lamp circuit.

3. A vehicle illumination system including a source of electrical power, an operating lamp circuit having a plurality of operating lamps and switch means connecting said operating lamps to said source, a stop signal circuit having a stop lamp and switch means connecting said stop lamp to said source, a turn signal circuit having a pair of turn indicator lamps connected in separately energizable circuits and switch means connecting either of said turn indicator lamps to said source, a stop lamp dimming circuit including means for dimming the intensity of said stop lamp and auxiliary switch means inserting said stop lamp dimming means in circuit with said stop lamp, a turn signal lamp dimming circuit including means for dimming the intensity of said turn indicator lamps and separate auxiliary switch means inserting said turn indicator lamp dimming means in circuit with either of said turn indicator lamps, and manually controlled gang means interconnecting said switch means of said operating lamp circuit, said switch means of said stop lamp dimming circuit and said auxiliary switch means of said turn signal dimming circuit and permitting switching of said stop lamp dimming means and of said turn signal lamp dimming means in and out of said stop lamp circuit and said turn indicator lamp circuit simultaneously with the operation of said switching means of said operating lamp circuit.

4. A vehicle illumination system including a source of electrical power, an operating lamp circuit having a plurality of operating lamps and switch means connecting said operating lamps to said electrical source, a turn signal circuit having a pair of turn indicator lamps connected in separately energizable circuits, turn switch means connecting either of said turn indicator lamps to said electrical source and a flasher connected in circuit with either of said turn indicator lamps through the said turn switch means thereof, a turn signal lamp dimming circuit including means for dimming the brilliance of said turn indicator lamps, auxiliary switch means inserting said dimming means in circuit with either of said turn indicator lamps, means connected to said electrical source through said auxiliary switch and said flasher maintaining the load on the flasher substantially constant in both the brilliant and dimmed condition of said turn indicator lamps, and manually operable gang means interconnecting said switch means of said operating lamp circuit and said auxiliary switch means of said turn signal lamp dimming circuit and permitting switching of said dimming means in and out of said turn signal lamp circuit simultaneously with the operation of said switch means of said operating lamp circuit.

5. A vehicle illumination system including a source of electrical power, an operating lamp circuit having a plurality of operating lamps and switch means connecting said operating lamps to said electrical source, a turn signal circuit having a pair of turn indicator lamps connected in separately energizable circuits, turn switch means connecting either of said turn indicator lamps to said electrical source and a flasher connected in circuit with either of said turn indicator lamps through the said turn switch means thereof, a turn signal lamp dimming circuit including a dimmer resistor, auxiliary switch means inserting said dimming resistor in voltage dropping circuit relation with either of said turn indicator lamps, a bleeder resistor connected to said electrical source through said auxiliary switch means and said flasher and maintaining the load on the flasher substantially constant in both the brilliant and dimmed condition of said turn indicator lamps, and manually operable ganged means interconnecting said switch means of said operating lamp circuit and said auxiliary switch means and permitting switching of said dimmer resistor and said bleeder resistor in and out of said turn signal lamp circuit simultaneously with the operation of said switch means of said operating lamp circuit.

6. A vehicle illumination system including a source of electrical power, an operating lamp circuit having a plurality of operating lamps and switch means connecting said operating lamps to said electrical source, a stop signal circuit having a stop lamp and switch means connecting said stop lamp to said electrical source, a turn signal circuit having a pair of turn indicator lamps connected in separately energizable circuits, switch means connecting either of said turn indicator lamps to said electrical source and a flasher connected in circuit with either of said turn indicator lamps through the said switch means thereof, a stop lamp dimming circuit including means for dimming the intensity of said stop lamp and auxiliary switch means inserting said stop lamp dimming means in circuit with said stop lamp, a turn indicator lamp dimming circuit including means for dimming the intensity of said turn indicator lamps, separate auxiliary switch means inserting said turn indicator dimming means in circuit with either of said turn indicator lights, means connected to said electrical source through said auxiliary switch and said flasher of said turn indicator circuit and maintaining the load on the flasher substantially constant in both the brilliant and dimmed condition of said twin indicator lamps, and manually operable gang means interconnecting said switch means of said operating lamp circuit, said auxiliary switch means of said stop lamp circuit, and said separate auxiliary switch means of said turn indicator lamp circuit and permitting switching of said dimming means of said stop lamp circuit and switching of said dimming means and said flasher load maintaining means of said turn signal circuit in and out of said stop lamp circuit and said turn signal circuit simultaneously with the operation of said switch means of said operating lamp circuit.

References Cited in the file of this patent
UNITED STATES PATENTS

| | | |
|---|---|---|
| 1,231,268 | Knauff | June 26, 1917 |
| 2,091,086 | Taylor | Aug. 24, 1937 |
| 2,361,630 | Jacobi | Oct. 31, 1944 |
| 2,521,304 | North | Sept. 5, 1950 |